United States Patent
Wakameda et al.

(10) Patent No.: US 9,854,082 B2
(45) Date of Patent: Dec. 26, 2017

(54) SYSTEM AND METHOD FOR CONTROLLING EQUIPMENT INSTALLED WITHIN A BUILDING UPON RECEIVING DISASTER NOTIFICATION

(71) Applicant: FUJITSU LIMITED, Kawasaki-shi, Kanagawa (JP)

(72) Inventors: Hiroshi Wakameda, Fukuoka (JP); Naoto Seo, Koga (JP); Junji Satou, Fukuoka (JP); Xiang Du, Kasuga (JP)

(73) Assignee: FUJITSU LIMITED, Kawasaki (JP)

( * ) Notice: Subject to any disclaimer, the term of this patent is extended or adjusted under 35 U.S.C. 154(b) by 112 days.

(21) Appl. No.: 14/689,586

(22) Filed: Apr. 17, 2015

(65) Prior Publication Data
US 2015/0350404 A1 Dec. 3, 2015

(30) Foreign Application Priority Data
May 29, 2014 (JP) ................................. 2014-111623

(51) Int. Cl.
| | | |
|---|---|---|
| H04M 11/04 | (2006.01) | |
| H04W 24/00 | (2009.01) | |
| G05B 15/02 | (2006.01) | |
| H04M 1/725 | (2006.01) | |
| H04W 4/22 | (2009.01) | |

(52) U.S. Cl.
CPC ......... *H04M 1/72533* (2013.01); *H04W 4/22* (2013.01)

(58) Field of Classification Search
CPC .......................... G05B 13/02; G05B 2219/264
USPC ..................... 455/420, 456.1, 456.3; 700/726
See application file for complete search history.

(56) References Cited

U.S. PATENT DOCUMENTS

| | | | |
|---|---|---|---|
| 6,762,686 B1 * | 7/2004 | Tabe ..................... | G08B 25/08 340/541 |
| 2004/0026999 A1 * | 2/2004 | Hirota .................... | E05B 77/12 307/10.1 |
| 2012/0188346 A1 * | 7/2012 | Schnabl ................... | B61B 1/02 348/47 |
| 2013/0017812 A1 * | 1/2013 | Foster ................ | H04L 12/2825 455/417 |
| 2015/0061859 A1 * | 3/2015 | Matsuoka .............. | G08B 27/00 340/501 |
| 2015/0309483 A1 * | 10/2015 | Lyman ................... | G05B 15/02 700/275 |

(Continued)

FOREIGN PATENT DOCUMENTS

| | | |
|---|---|---|
| JP | 2012-231363 | 11/2012 |
| JP | 2013-98809 | 5/2013 |
| JP | 2013-207640 | 10/2013 |

*Primary Examiner* — Joshua Schwartz
(74) *Attorney, Agent, or Firm* — Staas & Halsey LLP

(57) ABSTRACT

An equipment control system includes a disaster notification apparatus configured to transmit a disaster notification, and a wireless communication apparatus provided in a building. The wireless communication apparatus receives the disaster notification, and determines whether a user of a portable terminal is present in the building, based on a communication situation between the wireless communication apparatus and one or more portable terminals. Upon receiving the disaster notification, the wireless communication apparatus controls one or more pieces of equipment installed within the building, differently depending on whether the user of the portable terminal is present in the building.

15 Claims, 15 Drawing Sheets

(56) References Cited

U.S. PATENT DOCUMENTS

2016/0202140 A1* 7/2016 Poon ..................... G01M 3/40
                                                                     29/593

\* cited by examiner

FIG.9

| WARNING TYPE VALUE | WARNING TYPE |
|---|---|
| 0 | Earthquake |
| 1 | Tsunami |
| 10 | Earthquake and Tsunami |
| 11 | Test |
| 100 | Other |
| 000101-1111111 | Reserved for future use |

SYSTEM AND METHOD FOR CONTROLLING EQUIPMENT INSTALLED WITHIN A BUILDING UPON RECEIVING DISASTER NOTIFICATION

CROSS-REFERENCE TO RELATED APPLICATION

This application is based upon and claims the benefit of priority from the prior Japanese Patent Application No. 2014-111623 filed on May 29, 2014, the entire contents of which are incorporated herein by reference.

FIELD

The embodiments discussed herein are related to system and method for controlling equipment installed within a building upon receiving disaster notification.

BACKGROUND

There is a system called ETWS (Earthquake and Tsunami Warning System) standardized in 3GPP (3rd Generation Partnership Project). The ETWS is a system which notifies a portable terminal of a user of, for example, an occurrence of a tsunami or an earthquake. As a related technique, a small-sized wireless base station which controls pieces of equipment having information such as, for example, a disaster occurrence source or an evacuation information source by receiving emergency earthquake news flash information has been proposed.

A related technique is disclosed in, for example, Japanese Laid-Open Patent Publication No. 2012-231363.

SUMMARY

An equipment control system according to one aspect of the present disclosure includes a disaster notification apparatus configured to transmit a disaster notification, and a wireless communication apparatus provided in a building. The wireless communication apparatus receives the disaster notification, and determines whether a user of a portable terminal is present in the building, based on a communication situation between the wireless communication apparatus and one or more portable terminals. Upon receiving the disaster notification, the wireless communication apparatus controls one or more pieces of equipment installed within the building, differently depending on whether the user of the portable terminal is present in the building.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of an ETWS message, according to an embodiment;

DESCRIPTION OF EMBODIMENTS

Upon detecting the emergency earthquake news flash, the small-sized wireless base station performs a preset control of equipment, where the preset control of equipment is a fixed control. Upon receiving a disaster notification, it is preferable to perform a control of equipment in accordance with a situation at that time.

<Example of Equipment Control System>

Figure 1:
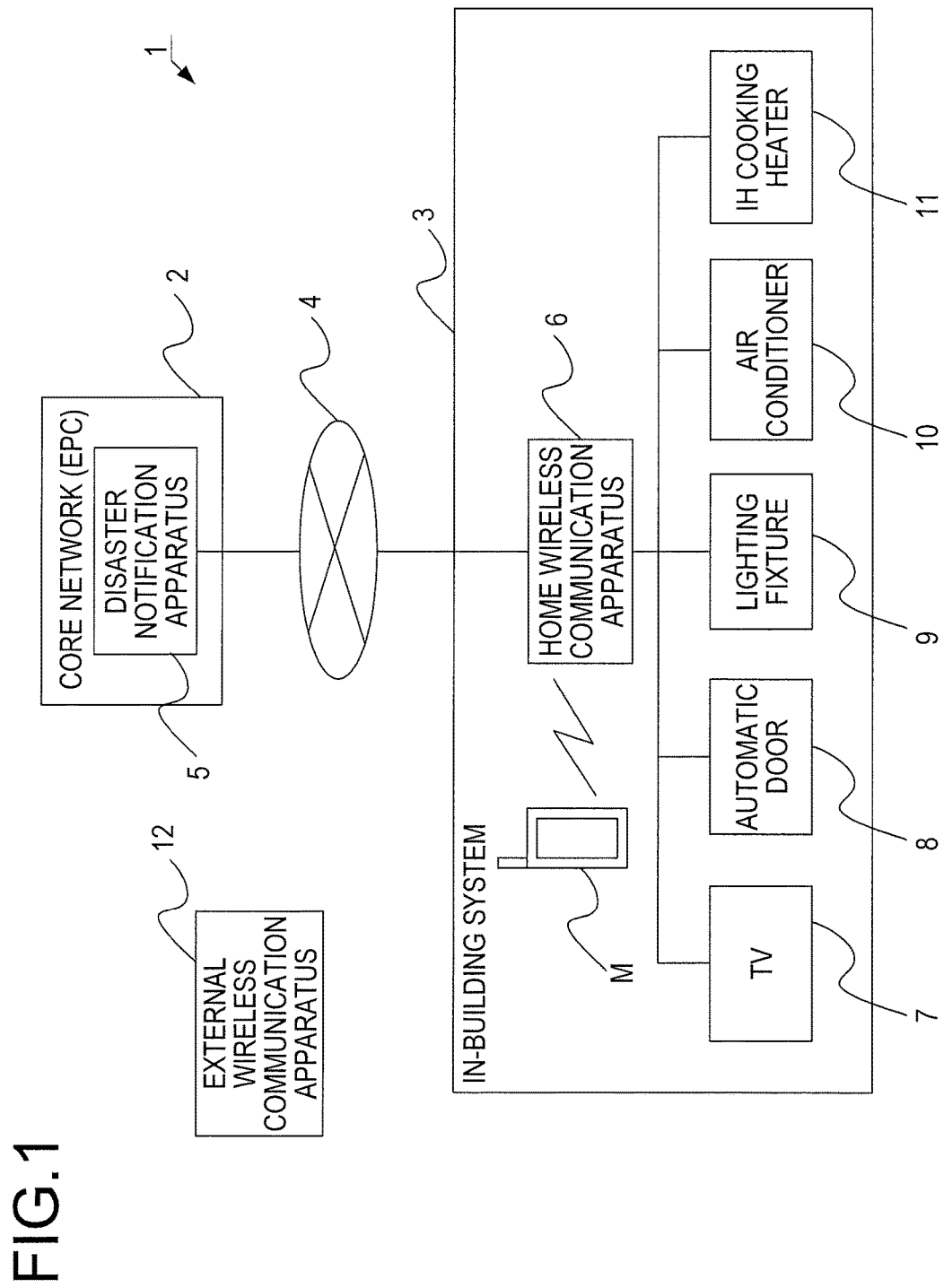
FIG. 1 is a diagram illustrating an example of an equipment control system, according an embodiment.

Hereinafter, descriptions will be made on embodiments of the present disclosure with reference to accompanying drawings. FIG. 1 is a diagram illustrating an example of an equipment control system, according to an embodiment. In the equipment control system 1, a core network 2 and an in-building system 3 are connected with each other through a network 4. The network 4 may be, for example, the network established through an internet connection or a dedicated connection.

The core network 2 is also called EPC (Evolved Packet Core). The core network 2 includes a disaster notification apparatus 5. The disaster notification apparatus 5 notifies the in-building system 3 of a disaster (hereinafter, referred to as a disaster notification) through the network 4. The disaster notification apparatus 5 may be also referred to as an MME (Mobile Management Entity). The MME performs the disaster notification using the ETWS function stipulated in the 3GPP standard technical specification.

The in-building system 3 is a system installed within the building. In the embodiment, the building is assumed as a house of an owner (hereinafter, referred to as a user) of the portable terminal. In the meantime, the building (house) may be a building for a home use as well as a building for a business use. For example, the building may be an office building. In this case, the user may be an employee who engages in a business.

The in-building system 3 is a system provided within the building. In the example of FIG. 1, the in-building system 3 includes a home wireless communication apparatus 6, a television (TV) 7, an automatic door 8, a lighting fixture 9, an air conditioner 10, and an IH (Induction Heating) cooking heater 11. The TV 7, the automatic door 8, the lighting fixture 9, the air conditioner 10, and the IH cooking heater 11 are examples of pieces of equipment, although the equipment is not limited to the examples illustrated in FIG. 1.

The home wireless communication apparatus 6 communicates with a portable terminal M of a user. In the embodiment, since the building is assumed as a house of the user, the home wireless communication apparatus 6 is installed as a wireless communication apparatus within the building. The home wireless communication apparatus 6 is an example of the wireless communication apparatus. The home wireless communication apparatus 6 performs a wireless communication at relatively short distances. Also, the home wireless communication apparatus 6 communicates with a pre-registered portable terminal M.

A CSG (Closed Subscriber Group) stipulated in 3GPP standard technical specification may be used for a function for communicating with the pre-registered portable terminal M. In the embodiment, the portable terminal M which belongs to the CSG is pre-registered in the home wireless communication apparatus 6.

The external wireless communication apparatus 12 communicates with the portable terminal M carried by the user. The external wireless communication apparatus 12 may be, for example, an external base station. For example, when a connection destination of the portable terminal M is switched from the external wireless communication apparatus 12 to the home wireless communication apparatus 6, a handover is performed.

<Example of Hardware Configuration of Home Wireless Communication Apparatus>

Next, descriptions will be made on an example of a hardware configuration of the home wireless communication apparatus 6. In the home wireless communication apparatus 6 of the example of FIG. 2, a processor 21, an RAM (Random Access Memory) 22, an ROM (Read Only Memory) 23, and an auxiliary storage device 24, a medium connection unit 25, and a communication interface 26 are connected to a bus 20. In the meantime, in FIG. 2, the communication interface is denoted as a "communication IF".

The processor 21 is an arbitrary processing circuit such as a CPU (Central Processing Unit). The processor 21 executes a program that has been loaded into the RAM 22. An equipment control program of the embodiment may be applied as the program to be executed. The ROM 23 which stores the program loaded into the RAM 22 is a non-volatile storage device.

The auxiliary storage device 24 is a storage device which stores various pieces of information and for example, a hard disk drive or a semiconductor memory may be applied for the auxiliary storage device 24. The medium connection unit 25 is installed to be connectable with a portable storage medium 25A. A portable memory or an optical disk (e.g., CD (Compact Disk) or DVD (Digital Video Disk)) may be applied for the portable storage medium 25A. The portable storage medium 25A may store the equipment control program of the embodiment.

The communication interface 26 is connected with a wired communication interface 27, a first wireless communication interface 28, and a second wireless communication interface 29. The first wireless communication interface 28 is connected with a first antenna 30. The second wireless communication interface 29 is connected with a second antenna 31. For example, a wired LAN (Local Area Network) may be applied for the wired communication interface 27. For example, a wireless LAN may be applied for the first wireless communication interface 28.

An RFID unit may be applied for the second wireless communication interface 29. The second wireless communication interface 29 communicates with the portable terminal M. The wired communication interface 27 and the first wireless communication interface 28 control, for example, the respective pieces of equipment described above, or receive the disaster notification from the disaster notification apparatus 5 described above.

In the meantime, the second wireless communication interface 29, which communicates with the portable terminal M, and the first wireless communication interface 28, which receive controls of the respective pieces of equipment or the disaster notification, may be integrally formed as a single wireless communication interface.

Each of the RAM 22, the ROM 23, and the auxiliary storage device 24 is an example of a tangible computer-readable storage medium. The tangible storage media is not a transitory medium such as a carrier wave.

<Example of Functional Block of Home Wireless Communication Apparatus>

Figure 3:
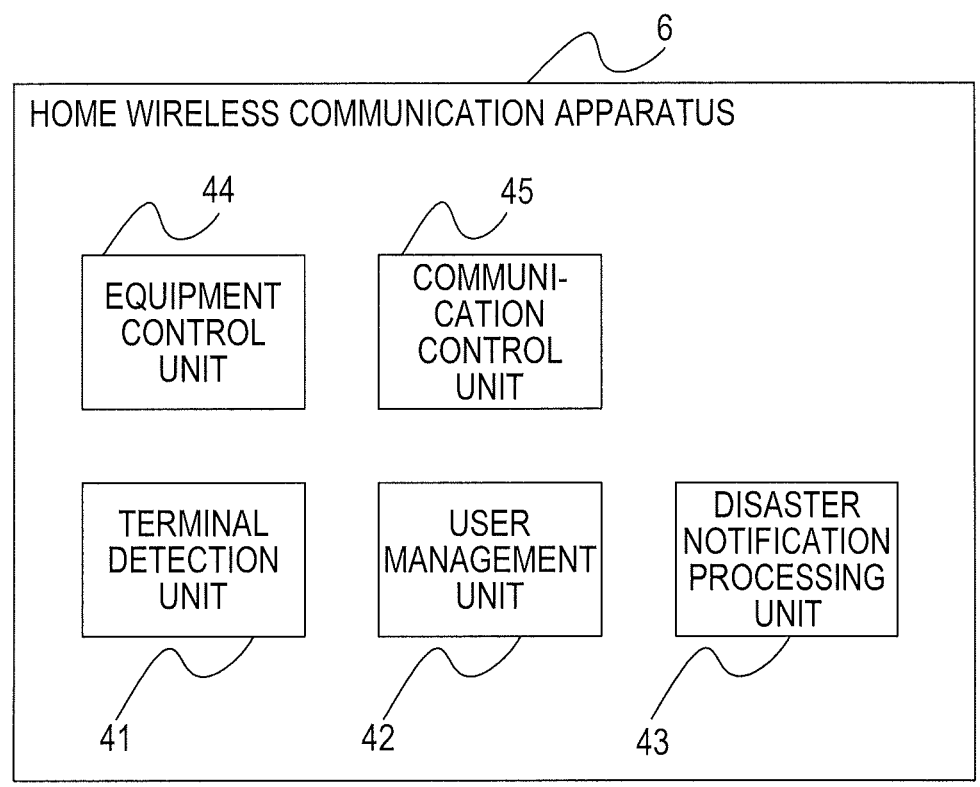
FIG. 3 is a diagram illustrating an example of a configuration of a home wireless communication apparatus, according to an embodiment.

FIG. 3 is a diagram illustrating an example of a configuration of a home wireless communication apparatus, according to an embodiment. The home wireless communication apparatus 6 illustrated in the example of FIG. 3 includes a terminal detection unit 41, a user management unit 4, a disaster notification processing unit 43, an equipment control unit 44, and a communication control unit 45.

The terminal detection unit 41 detects a communication situation of the portable terminal M for the home wireless communication apparatus 6. The communication situation of the portable terminal M indicates whether the portable terminal M is located within a communication range of the home wireless communication apparatus 6. For example, when the portable terminal M has performed a handover from the external wireless communication apparatus 12 to the home wireless communication apparatus 6, the communication situation of the portable terminal M indicates that the portable terminal M is located within the communication range of the home wireless communication apparatus 6. Further, when the portable terminal M has performed a handover from the home wireless communication apparatus 6 to the external wireless communication apparatus 12, the communication situation of the portable terminal M indicates that the portable terminal M is located outside the communication range of the home wireless communication apparatus 6.

Further, the terminal detection unit 41 determines whether the detected portable terminal M is a pre-registered portable terminal. In the embodiment, portable terminals M which belong to the CSG are pre-registered, and it is determined whether a detected portable terminal M is one of the portable terminals M belonging to the CSG.

For example, the terminal detection unit 41 may be configured to detect a portable terminal M when the portable terminal M performs a handover or attaches to the communication range of the home wireless communication apparatus 6. Further, the terminal detection unit 41 may either detect that the portable terminal M has moved into a communication range of the home wireless communication apparatus 6 or that the portable terminal M has moved outside the communication range.

The user management unit 42 determines whether the owner of the portable terminal M is present within the building via the terminal detection unit 41. The user management unit 42 which performs the determination of whether the owner of the portable terminal M is present within the building is an example of a determination unit.

Further, the user management unit 42 manages the number of users of the portable terminals M who are present within the building. Hereinafter, the owner of the portable terminal M is referred to as a user and the number of users is referred to as a user-count indicating the number of users. Further, the user management unit 42 manages information which identifies whether the user is present within the building. Hereinafter, the information is referred to as presence identification information.

In the example of the embodiment, when the terminal detection unit 41 detects that a portable terminal M registered in the CSG has moved into the communication range of the home wireless communication apparatus 6 from outside, the user management unit 42 increments a user-count indicating the number of users that are present within the building. When the user management unit 42 increments a user-count in a case where the user-count managed by the user management unit 42 is "0", the user-count becomes "1".

In the meantime, it is assumed that the portable terminal M moves outside of the communication range of the home wireless communication apparatus 6 when the user management unit 42 has determined that the user-count is "1". In this case, the terminal detection unit 41 detects that the portable terminal M registered in the CSG M has moved outside of the communication range of the home wireless communication apparatus 6. In this manner, the user management unit 42 decrements the user-count indicating the number of users who are present within the building. As a result, the user-count managed by the user management unit 42 becomes "0".

When an ETWS message is received from the disaster notification apparatus 5, the disaster notification processing unit 43 determines a distribution area based on the information set in the ETWS message, and broadcasts the ETWS message to the determined distribution area. The portable terminal M is able to receive the ETWS message.

The URL (Uniform Resource Locator) information may be added to the ETVVS message. Respective pieces of equipment are controlled depending on the situation at the time when a disaster is notified. The URL information is used for restoring the equipment state, after the equipment has been controlled, to an original state before being controlled.

The equipment control unit 44 performs a control on pieces of equipment, such as the TV 7, the automatic door 8, the lighting fixture 9, the air conditioner 10, and the IH cooking heater 11. The respective pieces of equipment are communicably connected to the home wireless communication apparatus 6. The equipment control unit 44 controls the respective pieces of equipment, in accordance with the presence identification information managed by the user management unit 42 and a disaster type of the ETWS message. The equipment control unit 44 is an example of a control unit.

Figure 2:
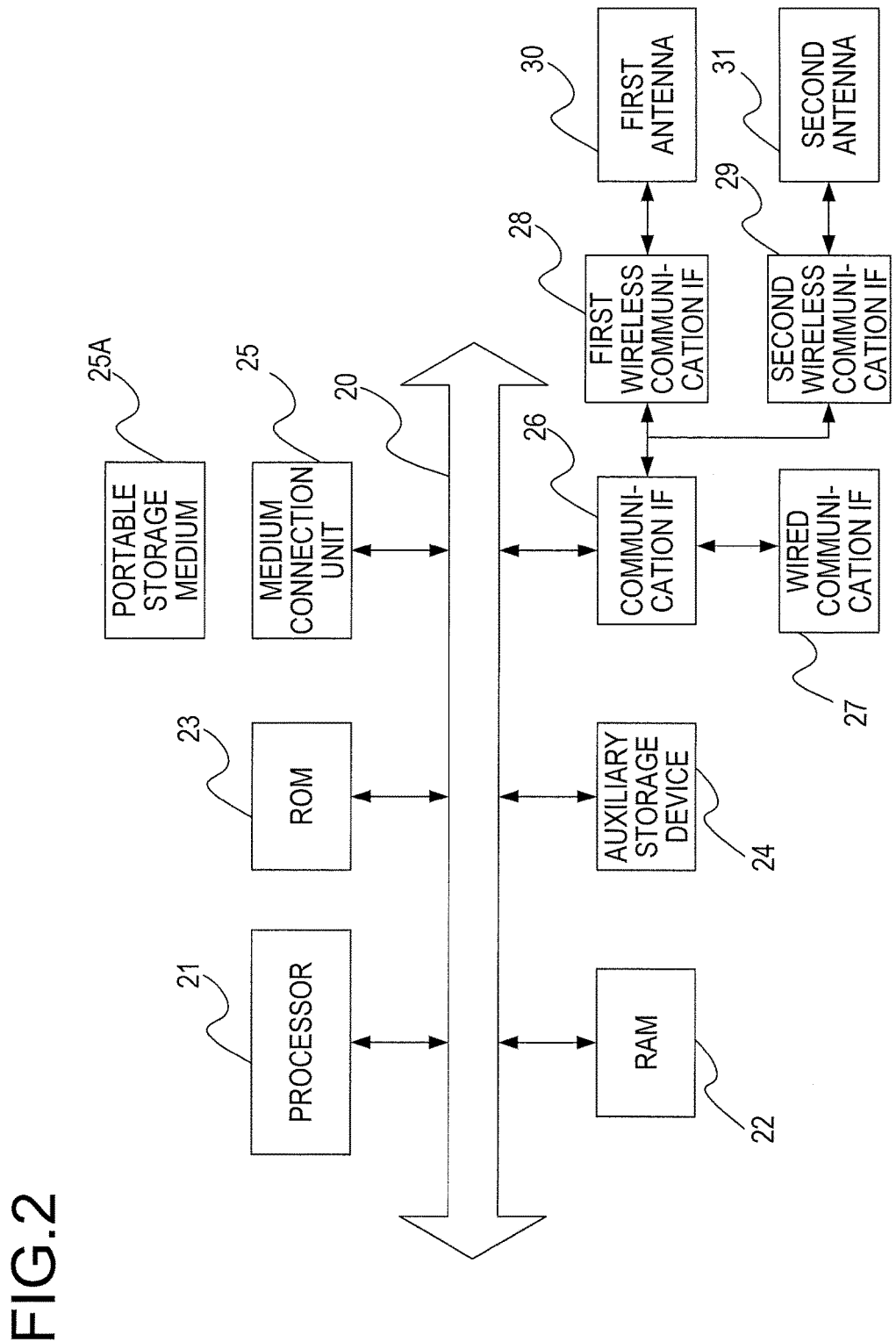
FIG. 2 is a diagram illustrating an example of a hardware configuration of a home wireless communication apparatus, according to an embodiment.

The communication control unit 45 controls the communication interface 26 illustrated in the example of FIG. 2. The control of the reception of ETVVS message, the control of respective pieces of equipment and the like, may be implemented by causing the communication control unit 45 to control the communication interface 26. Respective units in the example of FIG. 3 may be implemented by the processor 21 illustrated in the example of FIG. 2.

<Example of First Process>

Figure 4:
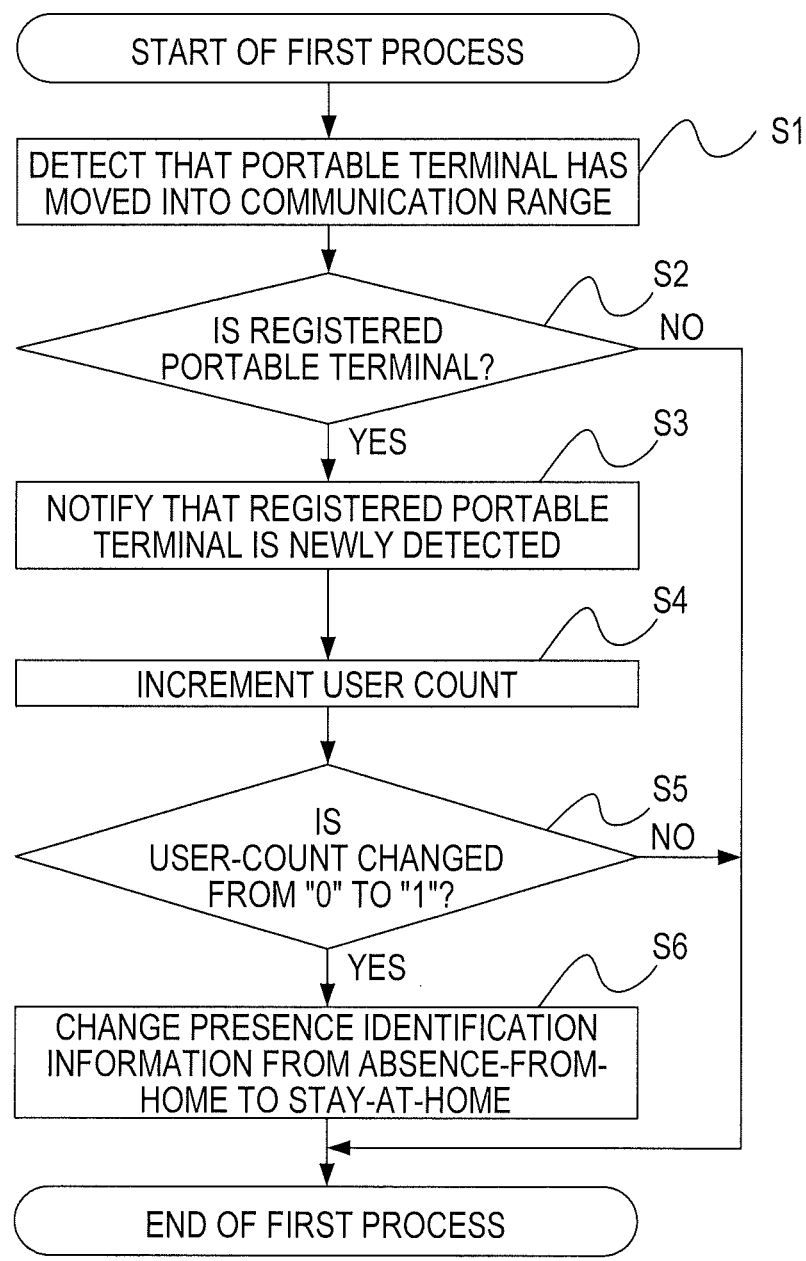
FIG. 4 is a diagram illustrating an example of an operational flowchart for a first process, according to an embodiment.

Next, descriptions will be made on a first process with reference to FIG. 4. The first process is an example of a process for, for example, a case where the portable terminal M of the user has moved into a communication range of the home wireless communication apparatus 6 from outside of the communication range. As the first process, for example, a process to be performed for a case where the user returns to his home from outside is assumed.

The terminal detection unit 41 detects that the portable terminal M has moved into the communication range of the home wireless communication apparatus 6 (S1). For example, when the communication destination of the portable terminal M has been handed over from the external wireless communication apparatus 12 to the home wireless communication apparatus 6, the terminal detection unit 41 detects a new portable terminal M.

Next, the terminal detection unit 41 determines whether the detected portable terminal M is the pre-registered portable terminal (S2). In the embodiment, the terminal detection unit 41 determines whether the detected portable terminal M is a portable terminal registered in the CSG.

For example, a card which identifies, for example, a telephone number of the portable terminal M is inserted into the portable terminal. Information indicating that the portable terminal M is a member of the CSG may be registered in the card. The card may be called SIM card (Subscriber Identity Module Card).

When the terminal detection unit 41 determines that the detected portable terminal M is not the pre-registered portable terminal ("NO" at S2), the first process is ended. In the meantime, when the terminal detection unit 41 determines that the detected portable terminal M is the pre-registered portable terminal ("YES" at S2), the terminal detection unit 41 notifies the user management unit 42 of information indicating that the registered portable terminal M is newly detected (S3).

Upon receiving the notification from the terminal detection unit 41, the user management unit 42 increments the user-count managed thereby (S4). Also, the user management unit 42 determines whether the user-count to be managed is changed from "0" to "1" (S5).

When the user management unit 42 determines that the user-count is changed from "0" to "1" ("YES" at S5), the user management unit 42 changes the presence identification information from absence-from-home to stay-at-home (S6). The presence identification information is information that indicates whether the user is present within the building. When the user is absent within the building, the presence identification information indicates the absence-from-home, and otherwise, when the user is present within the building, the presence identification information indicates the stay-at-home.

In the meantime, when the user management unit 42 determines that the user-count is not changed from a state of "0" (absence-from-home state) to a state of "1" (stay-at-home state) ("NO" at S5), the first process is ended. Further, when the user management unit 42 has changed the presence identification information from the absence-from-home to the stay-at-home at S6, the first process is ended.

<Example of Sequence Chart of First Process>

Next, descriptions will be made on an example of a sequence chart of the first process with reference to FIG. 5. The example of sequence chart of FIG. 5 illustrates the contents of processing of the respective pieces of equipment in a case where the portable terminal M has moved into the communication range of the home wireless communication apparatus 6 from outside of the communication range.

Figure 5:
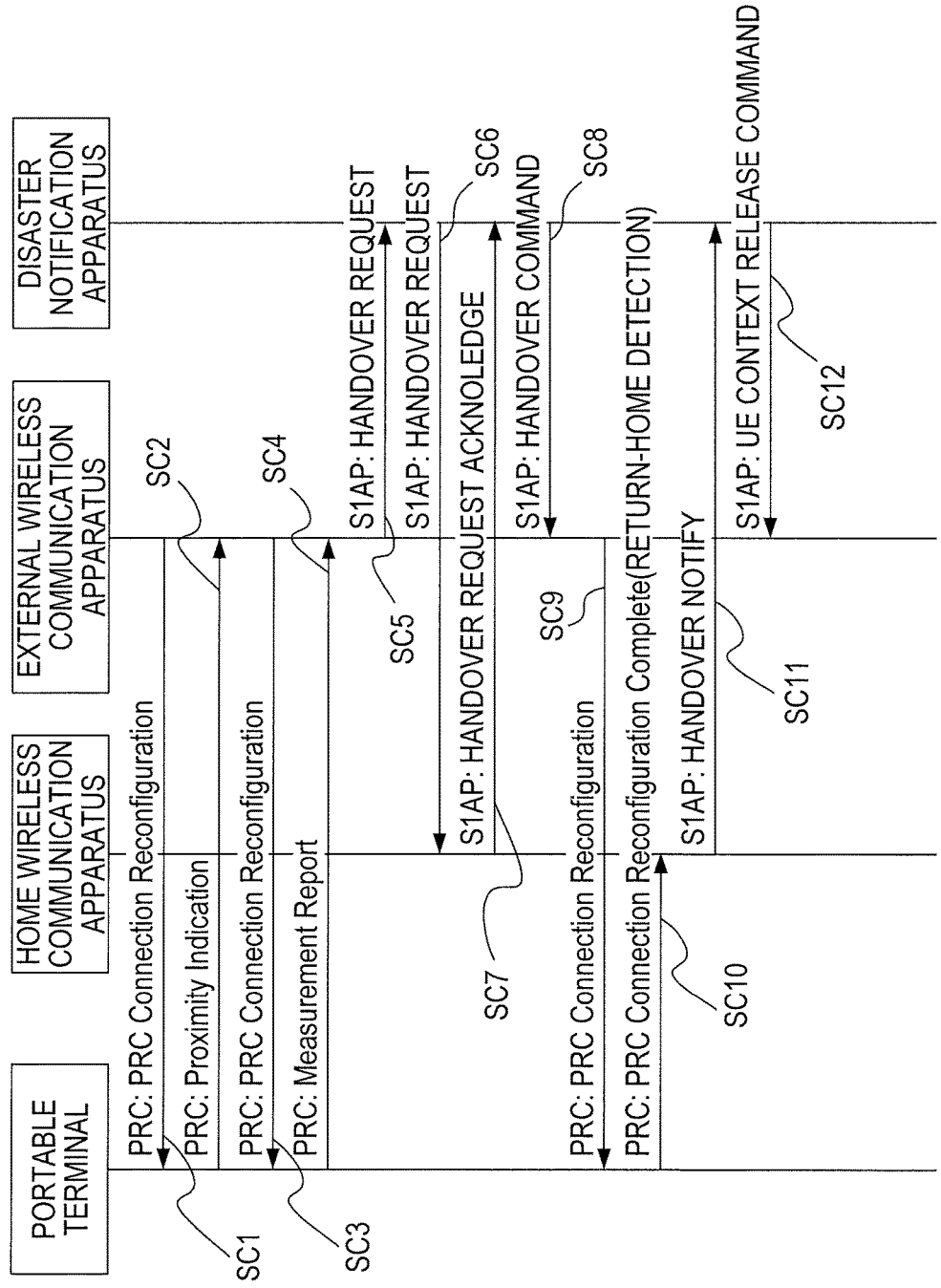
FIG. 5 is a diagram illustrating an example of an operational sequence for a first process, according to an embodiment.

In the example of FIG. 5, the portable terminal M may be referred to as "User Equipment (UE)". Further, the home wireless communication apparatus 6 may be referred to as a "Target eNB". Further, the external wireless communication apparatus 12 may be referred to as a "Source eNB". Further, the disaster notification apparatus may be referred to as the "MME" as described above.

First, the external wireless communication apparatus 12 causes the portable terminal M to search for a CSG cell (SC1). Also, the portable terminal M reports a search result to the external wireless communication apparatus 12 (SC2). The external wireless communication apparatus 12 causes the portable terminal M to measure a wireless communication quality of the CSG cell (SC3). Also, the portable terminal M reports a measured result to the external wireless communication apparatus 12 (SC4).

The external wireless communication apparatus 12 sends out a handover request to the disaster notification apparatus 5 (SC5). The disaster notification apparatus 5 requests the home wireless communication apparatus 6 to prepare resources, in response to the handover request (SC6).

The home wireless communication apparatus 6 prepares the resources and notifies the disaster notification apparatus 5 of information indicating that the preparation for handover is completed (SC7). The disaster notification apparatus 5 instructs the external wireless communication apparatus 12 to perform a handover to the home wireless communication apparatus 6 (SC8). The external wireless communication apparatus 12 instructs the portable terminal M to perform a handover to the home wireless communication apparatus 6 (SC9).

The portable terminal M performs a handover to the home wireless communication apparatus 6 (SC10). In this manner, the terminal detection unit 41 of the home wireless communication apparatus 6 may detect that the user of the portable terminal M registered in the CSG has moved into the communication range of the home wireless communication apparatus 6.

The home wireless communication apparatus 6 notifies the disaster notification apparatus 5 of completion of the handover (SC11). Since the communication destination of the portable terminal M is switched to the home wireless communication apparatus 6, the disaster notification apparatus 5 instructs the external wireless communication apparatus 12 to release the resources (SC12).

<Example of Second Process>

Figure 6:
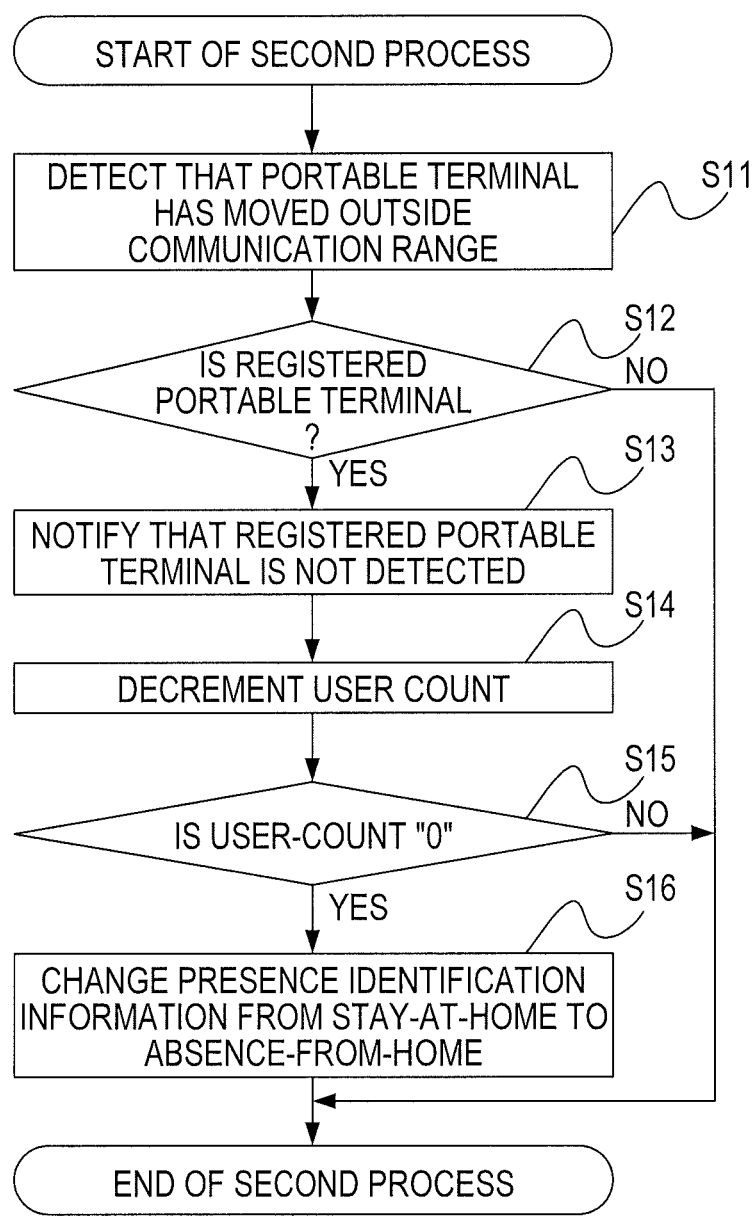
FIG. 6 is a diagram illustrating an example of an operational flowchart for a second process, according to an embodiment.

Next, descriptions will be made on a second process with reference to FIG. 6. The second process is an example of a process for, for example, a case where the portable terminal M of the user has moved from a communication range of the home wireless communication apparatus 6 to outside of the communication range. The terminal detection unit 41 detects whether the portable terminal M has moved from the communication range of the home wireless communication apparatus 6 to outside of the communication range (S11). For example, when the communication destination of the portable terminal M is handed over from the home wireless communication apparatus 6 to the external wireless communication apparatus 12, the terminal detection unit 41 detects the handover of the communication destination of the portable terminal M.

Next, the terminal detection unit 41 determines whether the detected portable terminal M is a pre-registered portable terminal (S12). When the terminal detection unit 41 determines that the detected portable terminal M is not the pre-registered portable terminal ("NO" at S12), the second process is ended.

In the meantime, when the terminal detection unit 41 determines that the detected portable terminal M is the pre-registered portable terminal ("YES" at S12), the terminal detection unit 41 notifies the user management unit 42 of information indicating that the registered portable terminal M has moved out from the communication range of the home wireless communication apparatus 6 (S13).

Upon receiving the notification from the terminal detection unit 41, the user management unit 42 decrements the user-count managed thereby (S14). Also, the user management unit 42 determines whether the number of users to be managed is "0" (S15).

When the user management unit 42 determines that the user-count is "0" ("YES" at S15), the user management unit 42 changes the presence identification information from the stay-at-home to the absence-from-home (S16). In the meantime, when the user management unit 42 determines that the user-count is not "0" ("NO" at S15), the second process is ended. Further, when the user management unit 42 has changed the presence identification information from the stay-at-home to the absence-from-home at S16, the second process is ended.

<Example of Sequence Chart of Second Process>

Figure 7:
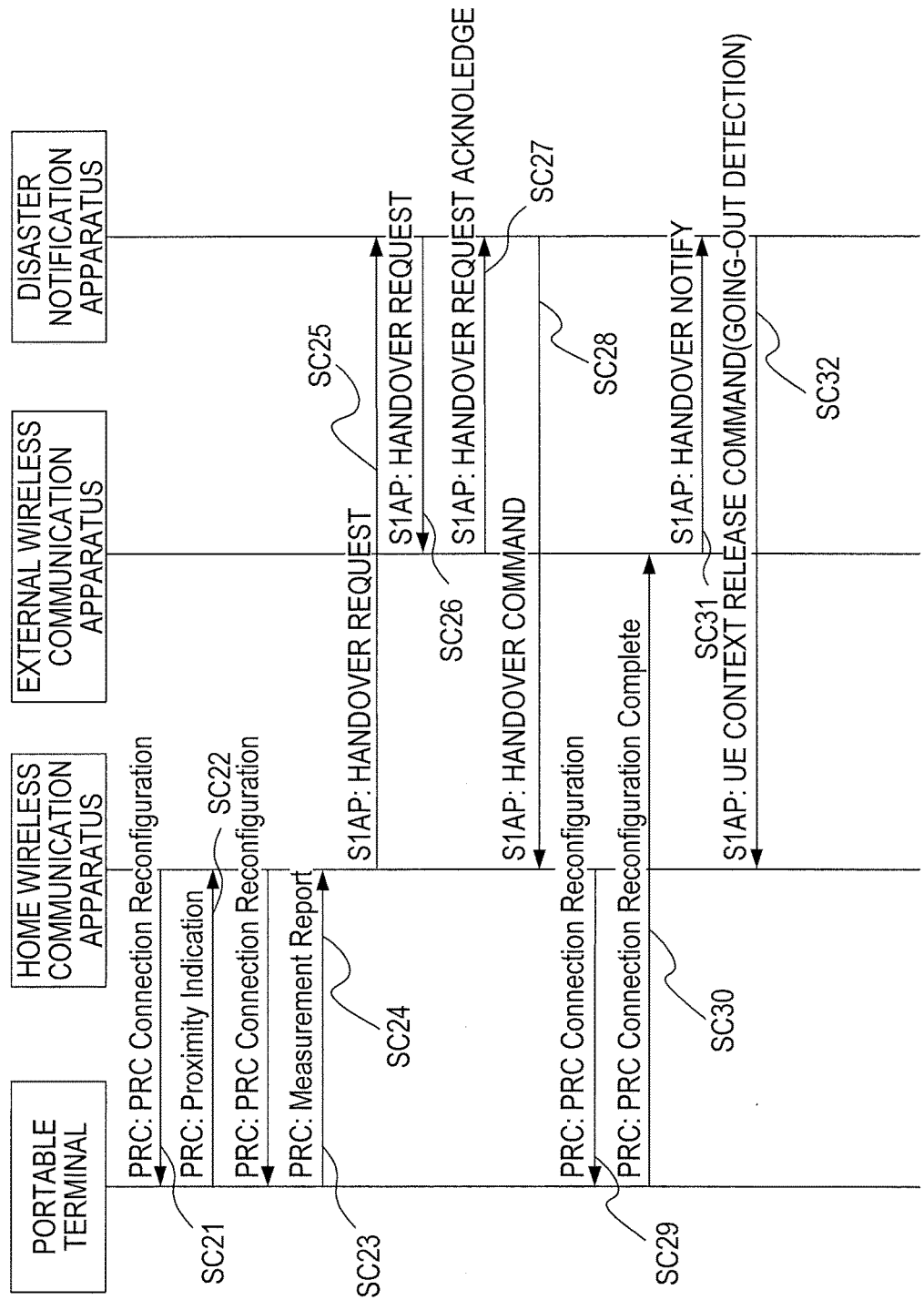
FIG. 7 is a diagram illustrating an example of an operational sequence for a second process, according to an embodiment.

Next, descriptions will be made on an example of a sequence chart of the second process with reference to FIG. 7. The example of sequence chart of FIG. 7 illustrates contents of processing on the respective pieces of equipment in a case where the portable terminal M has moved from the communication range of the home wireless communication apparatus 6 to outside of the communication range.

First, the home wireless communication apparatus 6 causes the portable terminal M to search for a cell of the external wireless communication apparatus 12 (SC21). Also, the portable terminal M reports a search result to the home wireless communication apparatus 6 (SC22). The home wireless communication apparatus 6 causes the portable terminal M to measure a wireless communication quality of the cell of the external wireless communication apparatus 12 (SC23). Also, the portable terminal M reports a measured result to the home wireless communication apparatus 6 (SC24).

The home wireless communication apparatus 6 sends out a handover request to the disaster notification apparatus 5 (SC25). The disaster notification apparatus 5 requests the external wireless communication apparatus 12 to prepare resources in response to the handover request (SC26).

The external wireless communication apparatus 12 prepares the resources and notifies the disaster notification apparatus 5 of information indicating that the preparation for handover is completed (SC27). The disaster notification apparatus 5 instructs the home wireless communication apparatus 6 to perform handover to the external wireless communication apparatus 12 (SC28). The home wireless communication apparatus 6 instructs the portable terminal M to perform a handover to the external wireless communication apparatus 12 (SC29).

The portable terminal M performs a handover to the external wireless communication apparatus 12 (SC30). The external wireless communication apparatus 12 notifies the disaster notification apparatus 5 of completion of the handover (SC31).

Since the communication destination of the portable terminal M has been switched to the external wireless communication apparatus 12, the disaster notification apparatus 5 instructs the home wireless communication apparatus 6 to release the resources (SC32). In this case, the home wireless communication apparatus 6 detects that the portable terminal M registered in the CSG has moved outside the communication range of the home wireless communication apparatus 6. That is, the home wireless communication apparatus 6 recognizes that the user of the portable terminal M went out.

<Example of Third Process>

Figure 8:
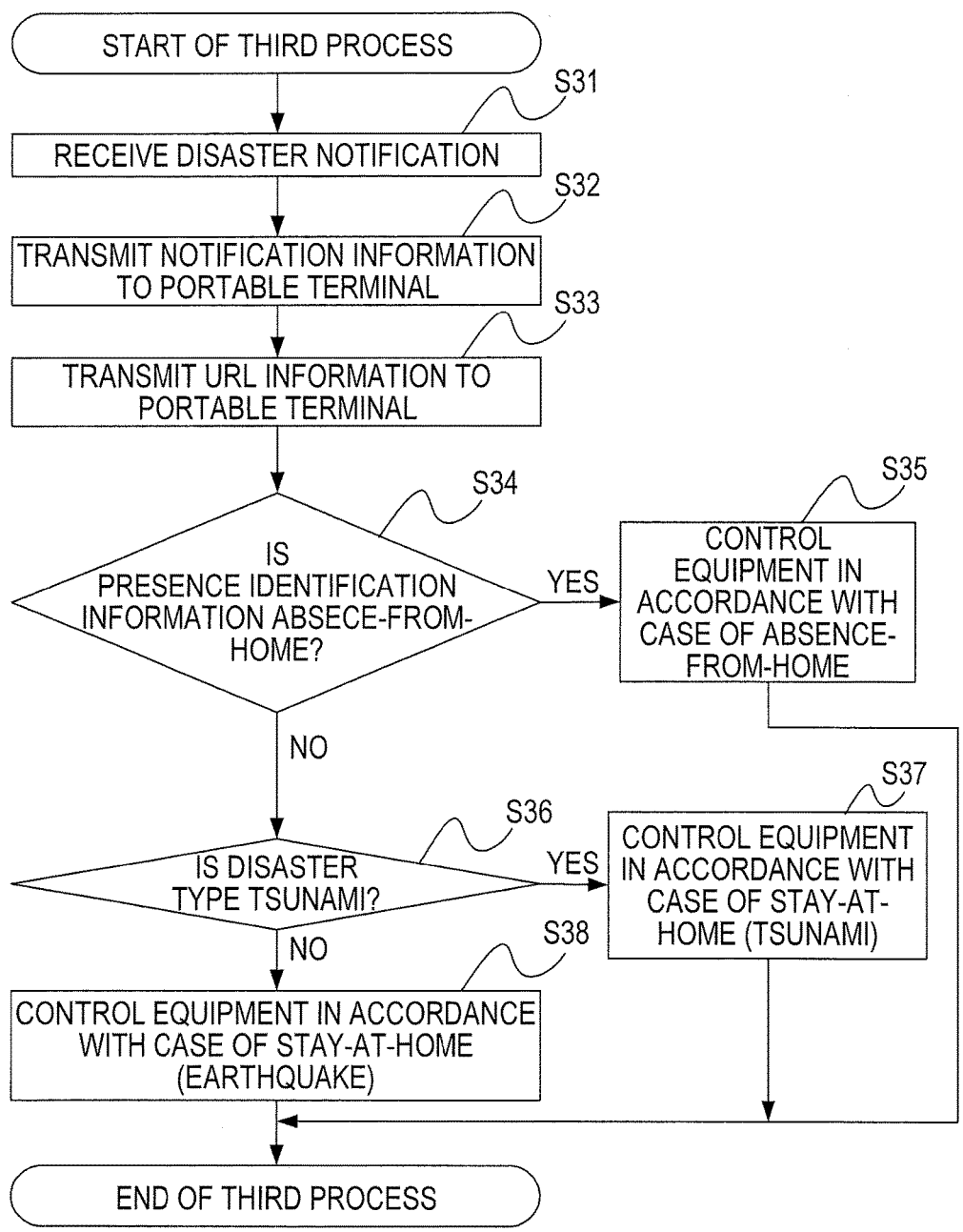
FIG. 8 is a diagram illustrating an example of an operational flowchart for a third process, according to an embodiment.

Next, descriptions will be made on a third process with reference to a flowchart FIG. 8. The third process is a process performed at the time when the disaster notification apparatus 5 has detected a disaster and transmitted a disaster notification. The home wireless communication apparatus 6 receives the disaster notification transmitted by the disaster notification apparatus 5 (S31). The disaster notification is an example of the ETWS message.

An example of the ETWS message is illustrated in FIG. 9. The ETWS message includes a "Warning type value" and a "Warning type". The "Warning type value" is a value to identify the "Warning type".

For example, when the "Warning type value" is a value of "0", the value indicates that the warning type is "earthquake"; when the "Warning type value" is a value of "1", the value indicates that the warning type is "tsunami"; and when the "Warning type value" is a value of "10", the value indicates that the warning type is "earthquake and tsunami". In this manner, a type of disaster may be identified.

In the meantime, a value of "11" is reserved for a test and a value of "100" is reserved for other use. Further, a value of "000101-111111" is reserved for future use.

Upon receiving the disaster notification, the disaster notification processing unit 43 transmits the notification information to the portable terminal M, which is capable of communicating with the home wireless communication apparatus 6 and registered in the CSG (S32). A SIB10 (System Information Block Type 10) may be used as the notification information. Otherwise, a SIB11 (System Information Block Type 11) may be used as the notification information.

The SIB10 and SIB11 are the emergency news flash information stipulated in the ETWS message. The disaster notification processing unit 43 simultaneously broadcasts the emergency news flash information to the portable terminals M. In this case, the disaster notification processing unit 43 controls the communication control unit 45 to transmit a paging signal and the URL information described above to the portable terminal M together with the emergency news flash information. In this manner, the paging signal and the URL information are transmitted to the portable terminal M (S33).

Next, the disaster notification processing unit 43 acquires the presence identification information from the user management unit 42. As described above, the presence identification information indicates whether a user is present in the building. The disaster notification processing unit 43 determines whether the user is in a state of the absence-from-home or the stay-at-home, based on the presence identification information (S34).

When it is determined that the presence identification information indicates the absence-from-home ("YES" at S34), the identification information is being set at "0". In this case, the equipment control unit 44 controls the equipment in accordance with a case of absence-from-home (S35). Then, the third process is ended.

When it is determined that the identification information indicates the stay-at-home ("NO" at S34), the identification information is being set at a value other than "0". In this case, the disaster notification processing unit 43 determines whether the disaster type is the tsunami, based on the disaster type contained in the received disaster notification (S36). For example, the information to identify whether the disaster is an earthquake, a tsunami, or an earthquake and a tsunami, is included in the ETWS message.

When it is determined that the disaster type is the tsunami ("YES" at S36), the presence identification information indicates the stay-at-home and the disaster type indicates the tsunami. The equipment control unit 44 controls the respective pieces of equipment in accordance with a case of stay-at-home and tsunami (S37). Then, the third process is ended.

In the meantime, when it is determined that the disaster type is the earthquake ("NO" at S36), the presence identification information indicates the stay-at-home and the disaster type indicates the earthquake. The equipment control unit 44 controls the respective pieces of equipment in accordance with a case of stay-at-home and earthquake (S38). Then, the third process is ended.

<Example of Sequence Chart of Third Process>

Figure 10:
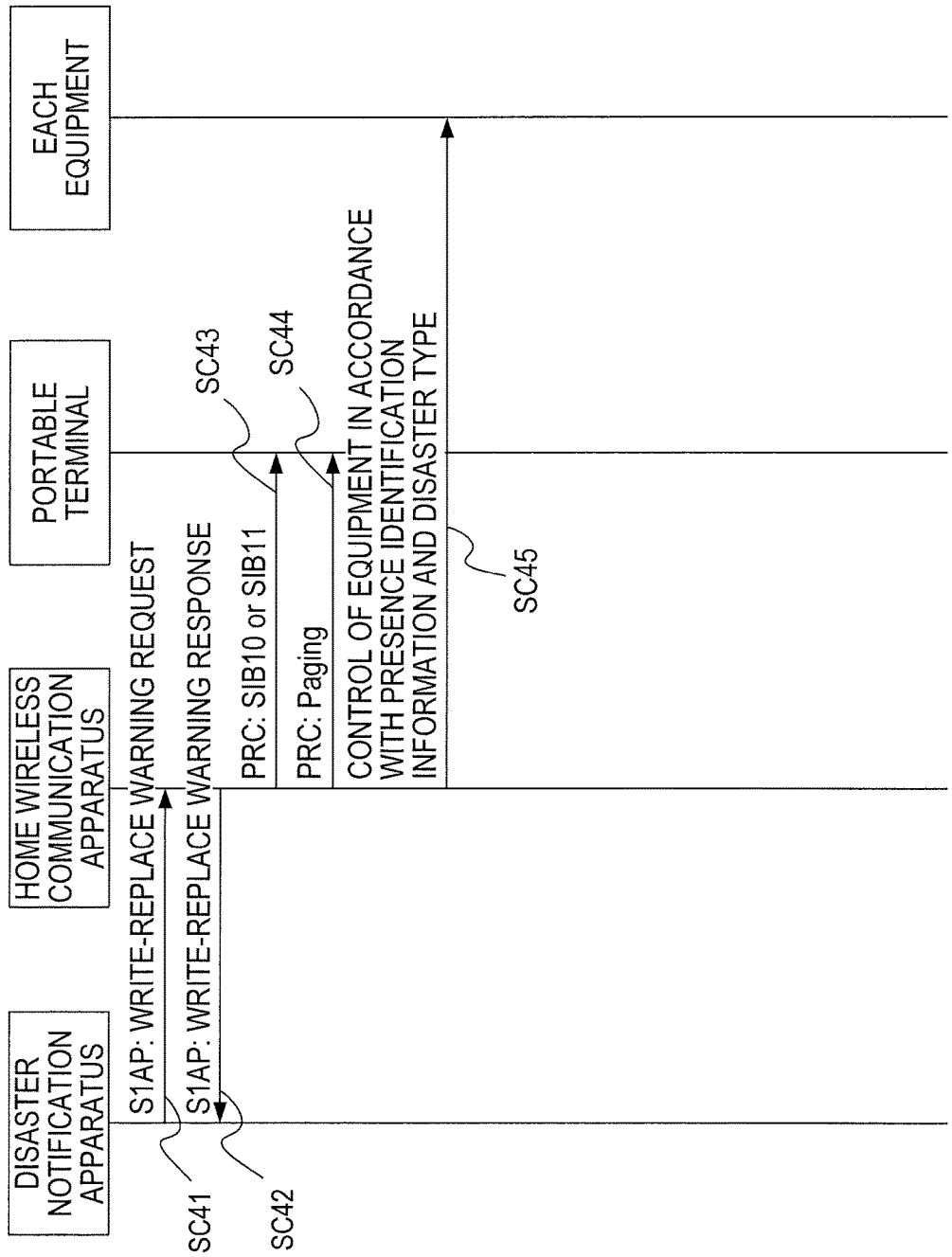
FIG. 10 is a diagram illustrating an example of an operational sequence for a third process, according to an embodiment.

Next, descriptions will be made on an example of a sequence chart of a third process with reference to FIG. 10. The disaster notification apparatus 5 transmits the disaster notification indicating that a disaster has occurred in a geographical area in which the home wireless communication apparatus 6 is installed to the home wireless communication apparatus 6 (SC41). The home wireless communication apparatus 6 responds to the disaster notification (SC42).

The home wireless communication apparatus 6 simultaneously transmits the notification information to the portable terminal M capable of communicating with the home wireless communication apparatus 6 and registered in the CSG (SC43). The home wireless communication apparatus 6 may transmit the emergency news flash information by using, for example, the SIB10 or SIB11. Also, the home wireless communication apparatus 6 transmits the paging signal to the portable terminal M (SC44).

The equipment control unit 44 of the home wireless communication apparatus 6 controls the equipment in accordance with the presence identification information and the disaster type (SC45). In the sequence chart illustrated in the example of FIG. 10, the processing steps other than SC45 are standard operations stipulated in the 3GPP standard technical specification.

<Example of Equipment Control>

Figure 11:
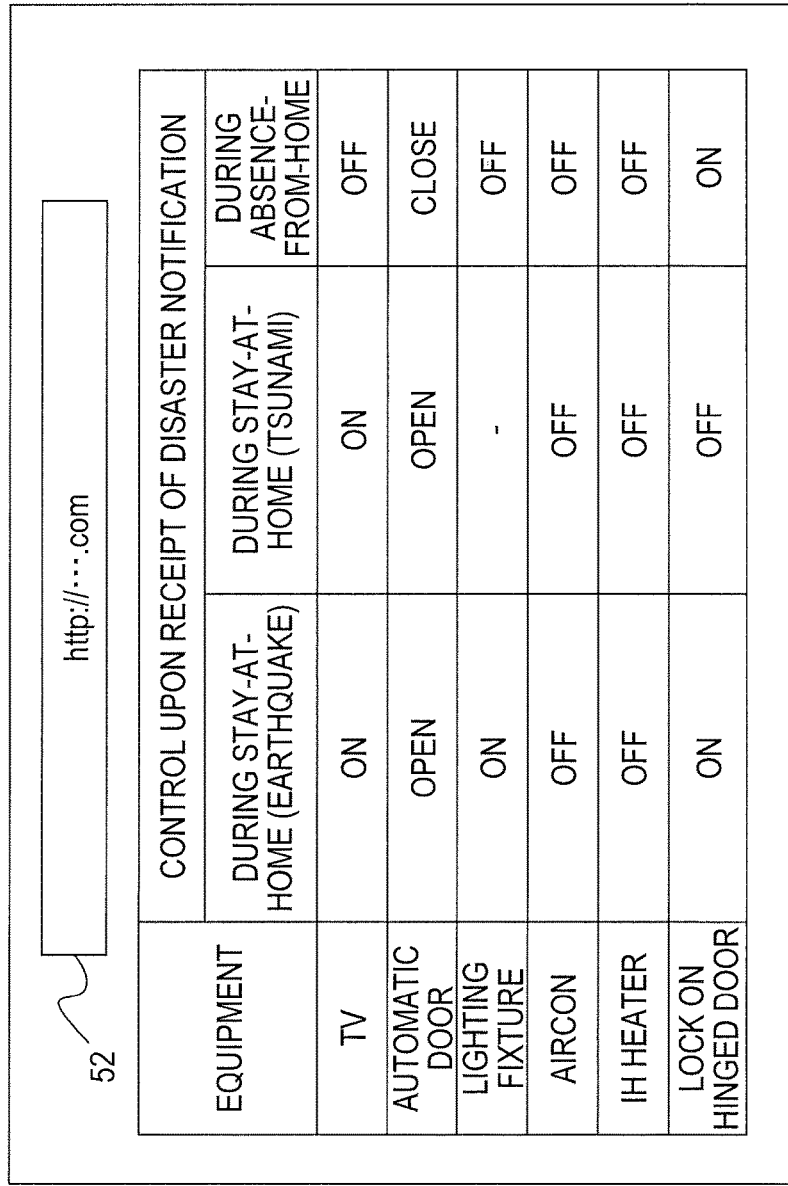
FIG. 11 is a diagram illustrating an example of a screen where settings for controlling equipment are made, according to an embodiment.

FIG. 11 is a diagram illustrating an example of a screen for setting respective pieces of equipment controlled by a home wireless communication apparatus, according to an embodiment. In the screen 51 of the example of FIG. 11, the control parameters of each of the TV 7, the automatic door 8, the lighting fixture 9, the air conditioner 10, and the IH cooking heater 11 may be set.

Further, when the disaster notification is received, the controls may be set for each piece of equipment in accordance with three situations consisting of: a case of (1), that is, stay-at-home and earthquake; a case of (2), that is, stay-at-home and tsunami; and a case of (3), that is, absence-from-home. In the example of FIG. 11, the case of (1) is denoted as "during stay-at-home (earthquake)", the case of (2) is denoted as "during stay-at-home (tsunami)", and the case of (3) is denoted as "during absence-from-home".

The controls of the respective pieces of equipment illustrated in the example of FIG. 11 are set, as initial values, at values suitable for a case where the disaster notification is received. For example, when one or more users are present in the building, the equipment control unit 47 may control the TV 7 to be turned ON regardless of the disaster type. Therefore, when the presence identification information of the user management unit 42 indicates the stay-at-home, the equipment control unit 47 performs a control to turn on the TV 7. In this manner, control is made in such a way that information is output from the TV 7. The TV 7 is an example of information output equipment.

Since the TV is automatically turned on, the user who is present in the building may obtain detailed information regarding the disaster. In the meantime, when the user is in the absence-from-home state, the equipment control unit 47 may control the TV 7 to be turned off regardless of the disaster type. Also, the same control as that for the TV may be applied for equipment other than TV which outputs information (e.g., radio).

Automatic turning on of the power supply for the TV 7 even in a case where the user is in a state of the absence-from-home poses a potential risk of causing a secondary damage called the electrical leakage during the disaster. Accordingly, unnecessary supply of current for the TV 7 may be avoided. Further, unnecessary power consumption also occurs. Therefore, when the presence identification information of the user management unit 42 indicates the absence-from-home of the user, the equipment control unit 47 performs a control to turn off the TV 7.

Further, when the presence identification information indicates the stay-at-home of the user, the automatic door 8 may be opened regardless of the disaster type in order to secure an evacuation route. Therefore, the equipment control unit 44 performs a control to cause the automatic door 8 to be set at "OPEN".

When the user is in the absence-from-home state, the automatic door 8 may be locked in a closed state. When the user is absent within the building, evacuation of the user may not be performed. In the meantime, when the user is in the absence-from-home state and the automatic door 8 is in an open state, there is a possibility of causing an occurrence of a secondary damage, such as a sneak-thief. Therefore, the equipment control unit 44 performs a control to lock the automatic door 8 in its closed state.

In the meantime, in a case where the door is capable of being controlled to be unlocked or locked even when the door of the building is not an automatic door, the equipment control unit 44 may unlock the door in a case where the user is in the stay-at-home state and lock the door in a case where the user is in the absence-from-home state.

When the presence identification information indicates the stay-at-home of the user and the disaster type indicates the earthquake, the equipment control unit 44 may turn on the lighting fixture 9 in order to secure an evacuation route. In particular, the lighting fixture 9 may be turned on in a case of, for example, at night time.

In the meantime, when the disaster type is "tsunami", the user has extra time than a case of earthquake. Therefore, the equipment control unit 44 causes the lighting fixture 9 to be kept on the state as it is. That is, upon receipt of the disaster notification, when the lighting fixture 9 is in the "OFF" state, the lighting fixture 9 is maintained as its turned "OFF" state, and when the lighting fixture 9 is in the "ON" state, the lighting fixture 9 is maintained as its turned "ON" state.

Since the lighting fixture 9 is not necessary to be turned on when the presence identification information indicates the absence-from-home of the user, the equipment control unit 44 turns off the lighting fixture 9. In this manner, the secondary damage such as an electrical leakage may be prevented. Further, unnecessary power consumption may be suppressed.

In a case where the disaster notification is received when the presence identification information indicates the stay-at-home of the user, the equipment control unit 44 turns off the air conditioner 10 (denoted as "aircon" in FIG. 11) regardless of the disaster type. The air conditioner 10 is not to be used during occurrence of the disaster regardless of whether the disaster type is the earthquake or the tsunami.

Accordingly, in this case, the equipment control unit 44 turns off the air conditioner 10. Similarly, the equipment control unit 44 also turns off the air conditioner 10 even in a case where the user is in the absence-from-home state. In this manner, the secondary damage such as the electrical leakage may be prevented. Further, unnecessary power consumption may be suppressed.

In a case where the disaster notification is received when the presence identification information indicates the stay-at-home of the user, the equipment control unit 44 turns off the IH cooking heater 11 (denoted as "IH heater" in FIG. 11) regardless of the disaster type.

The equipment control unit 44 similarly turns off the IH cooking heater 11 in a case where the presence identification information indicates the absence-from-home of the user. During the occurrence of the disaster, the IH cooking heater 11 may be turned off in order to prevent the outbreak of fire. Therefore, the equipment control unit 44 performs a control to turn off the IH cooking heater 11.

When the presence identification information indicates the stay-at-home and the disaster type indicates the earthquake, the equipment control unit 44 performs a control to turn on a door lock (that is, a door locking device). Descriptions will be made on the door lock. The door lock has a functionality which automatically locks the door of, for example, a shelf for foods or a cabinet, and is capable of controlling locking and unlocking by, for example, a control signal from the equipment control unit 44.

When a large-scale earthquake occurs, there is a possibility that the hinged door of the shelf for foods or the cabinet is opened and goods stored therein are scattered on the evacuation route. Otherwise, when the shelf for foods or the cabinet is placed in a higher position, the stored goods may have a possibility of being dropped off.

Accordingly, when the identification information indicates the stay-at-home of the user and the disaster type indicates the earthquake, lock on the hinged door may be set at "ON". This prevents the hinged door of the shelf for foods or the cabinet from being opened. In this case, the equipment control unit 44 performs a control to cause lock on the hinged door to be in an "ON" state.

In the meantime, when the disaster type indicates the tsunami, lock on the hinged door may be set at "OFF". In a case of the tsunami, extra time exist than a case of earthquake, and thus lock on the hinged door is controlled to be in an OFF state in order to make it possible to quickly take out the stored goods.

Therefore, when the presence identification information indicates the stay-at-home of the user and the disaster type indicates the earthquake, the equipment control unit 44 performs control to set lock on the hinged door at "ON".

When the presence identification information indicates the absence-from-home, since the goods stored in the shelf for foods or the cabinet are not required to be taken out, the equipment control unit 44 performs control to set lock on the hinged door at "ON".

The screen 51 illustrated in FIG. 11 is a screen of the portable terminal M. When the screen 51 is a touch panel display, the user may change the settings of the equipment with the desired settings by pressing an item whose setting is to be changed.

For example, when the presence identification information indicates the stay-at-home of the user and the disaster type is the tsunami, the lighting fixture 9 may be set to "ON". In the meantime, when the portable terminal M is equipped with a push button, the setting-up manipulation may be performed via the push button.

The screen 51 includes an address bar 52. The address bar 52 is an area where the URL information described above is input. Inputting to the address bar 52, the URL information that has been transmitted to the portable terminal M together with the emergency news flash information provides an operational tool for restoring the state of each piece of equipment changed by the equipment control unit 44 to an original state of the equipment.

Figure 12:
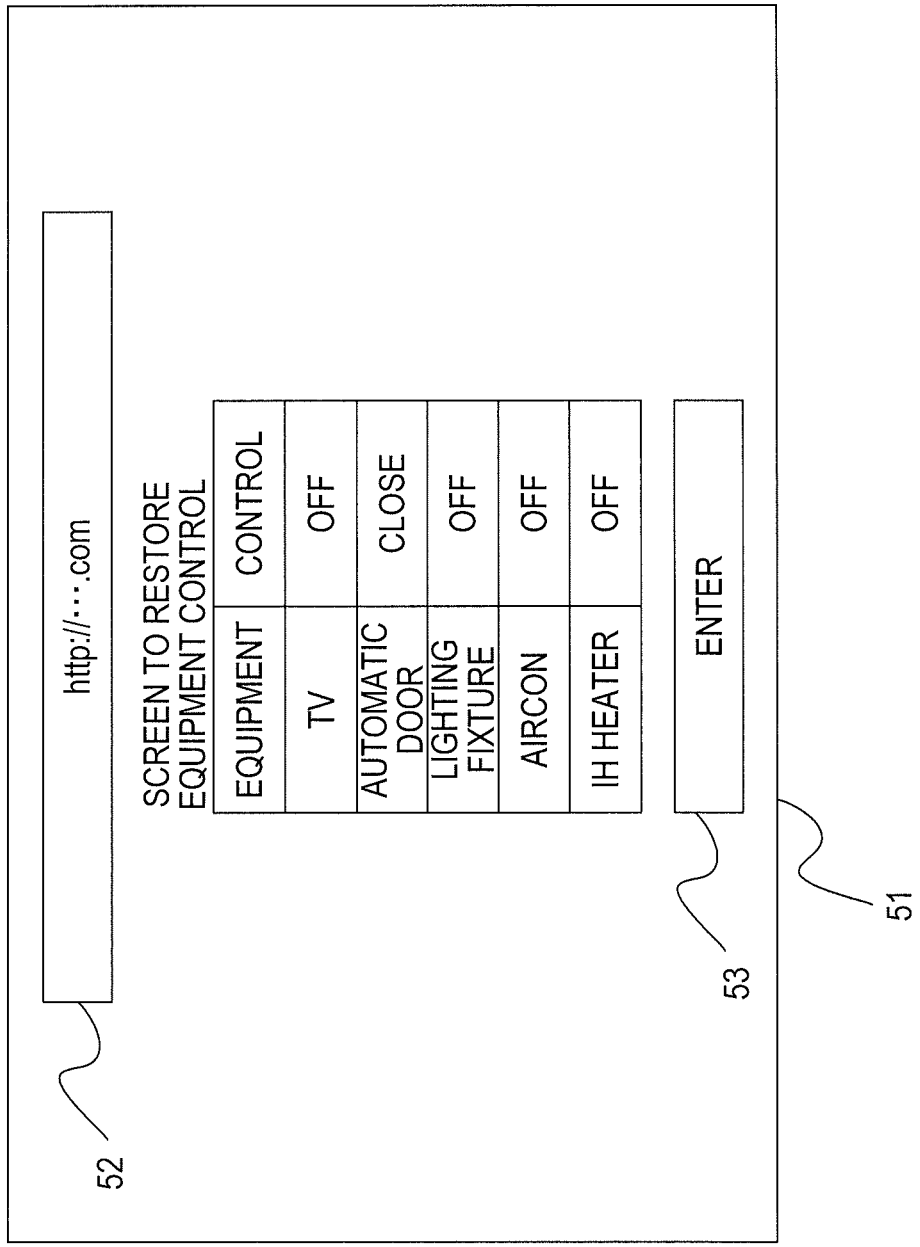
FIG. 12 is a diagram illustrating an example of a screen where an equipment control is restored to a state before an outbreak of a disaster, according to an embodiment.

FIG. 12 is a diagram illustrating an example of a screen, in which URL information is input to an address bar, indicating a page of the URL information, according to the embodiment. The screen 51 indicates the states (states of operation or control) of the respective pieces of equipment before reception of the disaster notification. When an enter key displayed on the screen 51 is depressed, the respective pieces of equipment returns to a state before being controlled by the home wireless communication apparatus 6. In this manner, the user may view the displayed screen 51 to confirm the states of the respective pieces of equipment that correspond to the states before reception of the disaster notification. Further, the respective pieces of equipment may be readily restored to the states before being controlled by the home wireless communication apparatus 6 by the manipulation through the screen 51. In the meantime, the respective pieces of equipment may be restored by selectively using an individual-type restoration or a batch-type restoration of the respective pieces of equipment.

First Specific Example

Figure 13:
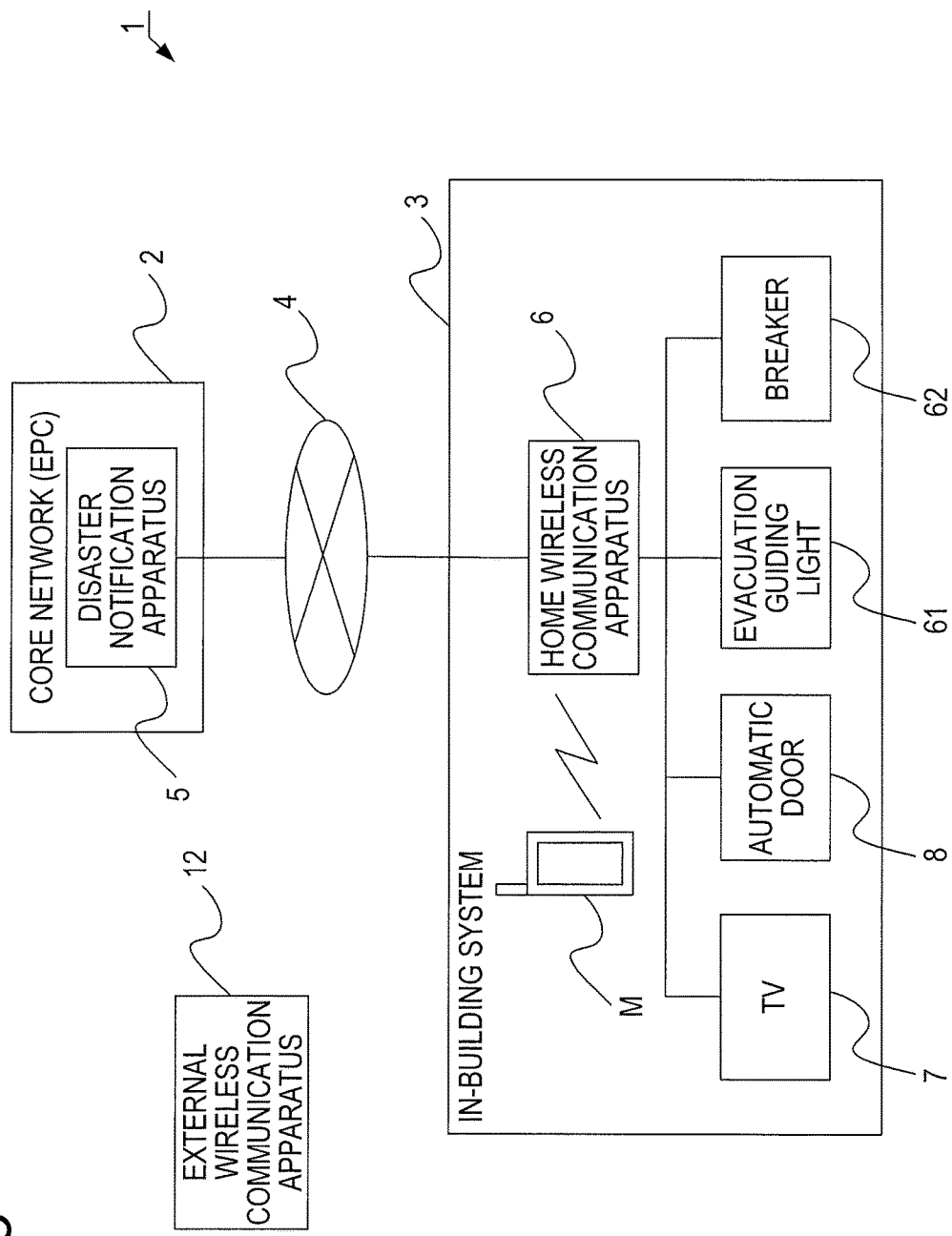
FIG. 13 is a diagram illustrating an example of an equipment control system, according to an embodiment.

Next, descriptions will be made on a first specific example. In the first specific example, the home wireless communication apparatus 6 is connected with the TV 7, the automatic door 8, an evacuation guiding light 61, and a breaker 62 as illustrated in an example of FIG. 13. The respective pieces of equipment that correspond to the TV 7, the automatic door 8, the evacuation guiding light 61, and the breaker 62 are controlled by the home wireless communication apparatus 6.

Figure 14:
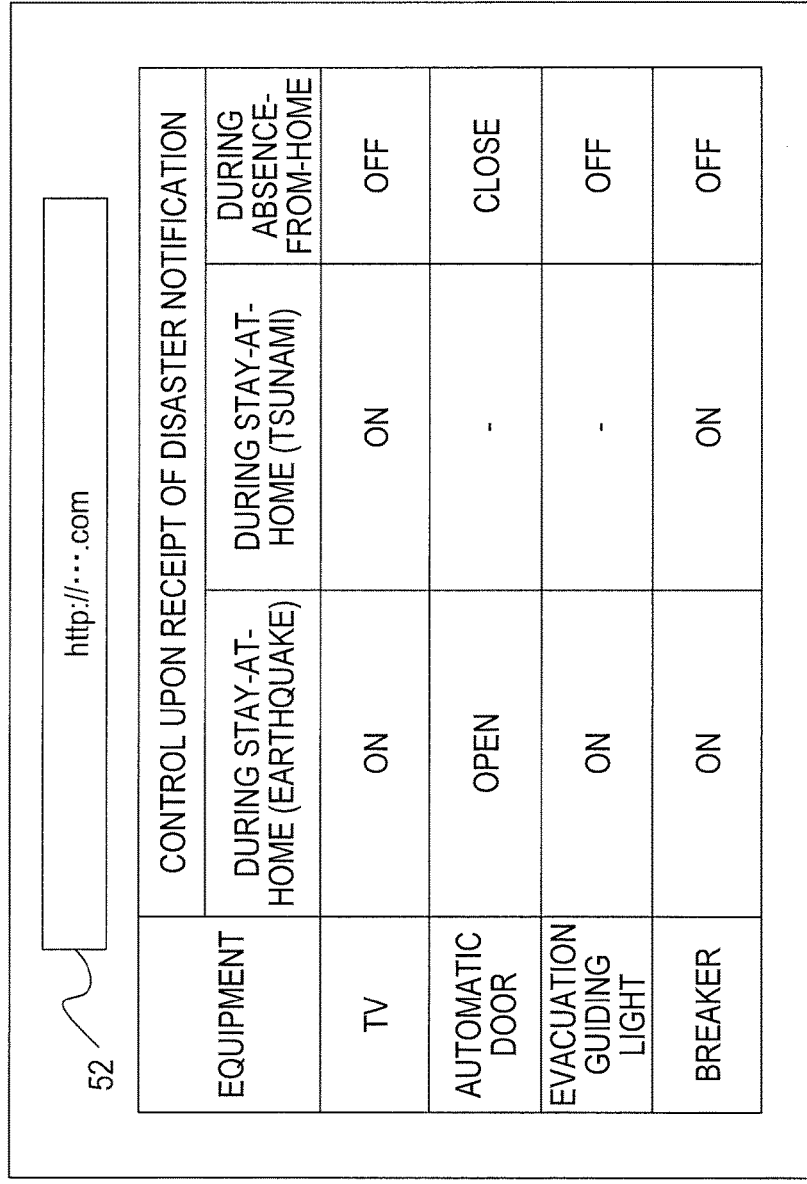
FIG. 14 is a diagram illustrating an example of a screen where settings used for controlling equipment are made, according to an embodiment.

FIG. 14 is a diagram illustrating an example of settings used for controlling respective pieces of equipment in accordance with presence identification information and a disaster type, according to an embodiment. In the first specific example, it is assumed that two users are registered in the CSG. Also, it is assumed that one user (user A) is present outside of the building and another one user (user B) is present in the building.

Accordingly, the terminal detection unit 41 does not detect the portable terminal M of the user A in the first specific example. Further, the terminal detection unit 41 detects the portable terminal M of the user B. Accordingly, the user management unit 42 recognizes that a user-count indicating the number of users who are present in the building is "1". Accordingly, the identification information indicates the stay-at-home.

For example, it is assumed that the portable terminal M of the user A moves from outside of the communication range of the home wireless communication apparatus 6 into the communication range. Since the portable terminal M of the user A has moved into the communication range of the home wireless communication apparatus 6, the terminal detection unit 41 notifies the user management unit 42 of information indicating that the user A has moved into the communication range of the home wireless communication apparatus 6. In this manner, the user management unit 42 increments the user-count so that the user-count has the value of "2".

In the first specific example, the disaster notification apparatus 5 notifies disaster notification indicating that the disaster type is the earthquake, to the home wireless communication apparatus 6 through the network 4. The disaster notification processing unit 43 recognizes the user-count as of "1" which is the number of users managed by the user management unit 42. That is, the disaster notification processing unit 43 recognizes that the user who is in the stay-at-home state is present.

The disaster notification processing unit 43 sends an instruction to the equipment control unit 44 to perform the equipment control illustrated in the example of FIG. 14. The equipment control unit 44 turns on the TV 7. This allows the user B to recognize detailed information, such as a seismic center, seismic intensity, and magnitude, from the TV 7.

Since the disaster notification such as an ETWS message has a limited amount of information, it is difficult to obtain the detailed information from the disaster notification. Accordingly, the equipment control unit 44 may turn on the TV 7 so that the user B obtains various detailed information.

Further, the equipment control unit 44 performs a control to make the automatic door 8 in an open state and to turn on the evacuation guiding light 61 so that the user B is secured to an evacuation route. Further, even in a case where the user B is not able to evacuate by himself, the user B may rapidly receive an assistance from outside since the automatic door 8 is in the open state.

Further, the equipment control unit 44 performs a control to turn on the breaker 62. The breaker 62 is a device which supplies electric power to the in-building system 3. When the breaker 62 is turned off, all pieces of electrical equipment installed at the user's house become disabled. For example, the lighting fixture 9 is unable to be used even at the night time. Accordingly, the equipment control unit 44 performs a control to turn on the breaker 62.

Here, it is assumed that the user B has evacuated from his house. The portable terminal M of the user B moves from the communication range of the home wireless communication apparatus 6 to outside of the communication range. When the terminal detection unit 41 detects that the portable terminal M of the user B has moved outside of the home wireless communication apparatus 6, the user management unit 42 decrements the user-count managed by the user management unit 42. That is, the user-count managed by the user management unit 42, whose value was "1", is decremented by the user management unit 42 so as to become "0".

In the case, the presence identification information is changed from the stay-at-home to the absence-from-home. Therefore, when the presence identification information is changed to the absence-from-home, the disaster notification processing unit 43 sends an instruction to the equipment control unit 44 to perform control in accordance with a case of the "during absence-from-home" indicated in FIG. 14.

The equipment control unit 44 turns off the TV 7, locks the automatic door 8 in a closed state, turns off the evacuation guiding light 61, and turns off the breaker 62. The equipment control unit 44 locks the automatic door 8 in a closed state so that the damage such as a sneak-thief is prevented. Further, the breaker 62 is turned off so that the secondary damage such as the electrical leakage is prevented.

Here, even when the disaster notification apparatus 5 has transmitted the disaster notification, there may be a case where evacuation is not needed depending on a disaster scale. For example, there may be a case where evacuation is not needed, for example, in a case where the seismic intensity is small or the seismic center is located far away.

The URL information is transmitted to the portable terminal M of the user B together with the disaster notification. When the manipulation which accesses the address indicated by the URL information is performed, the screen 51 illustrated in the example of FIG. 15 is displayed on the portable terminal M.

Figure 15:
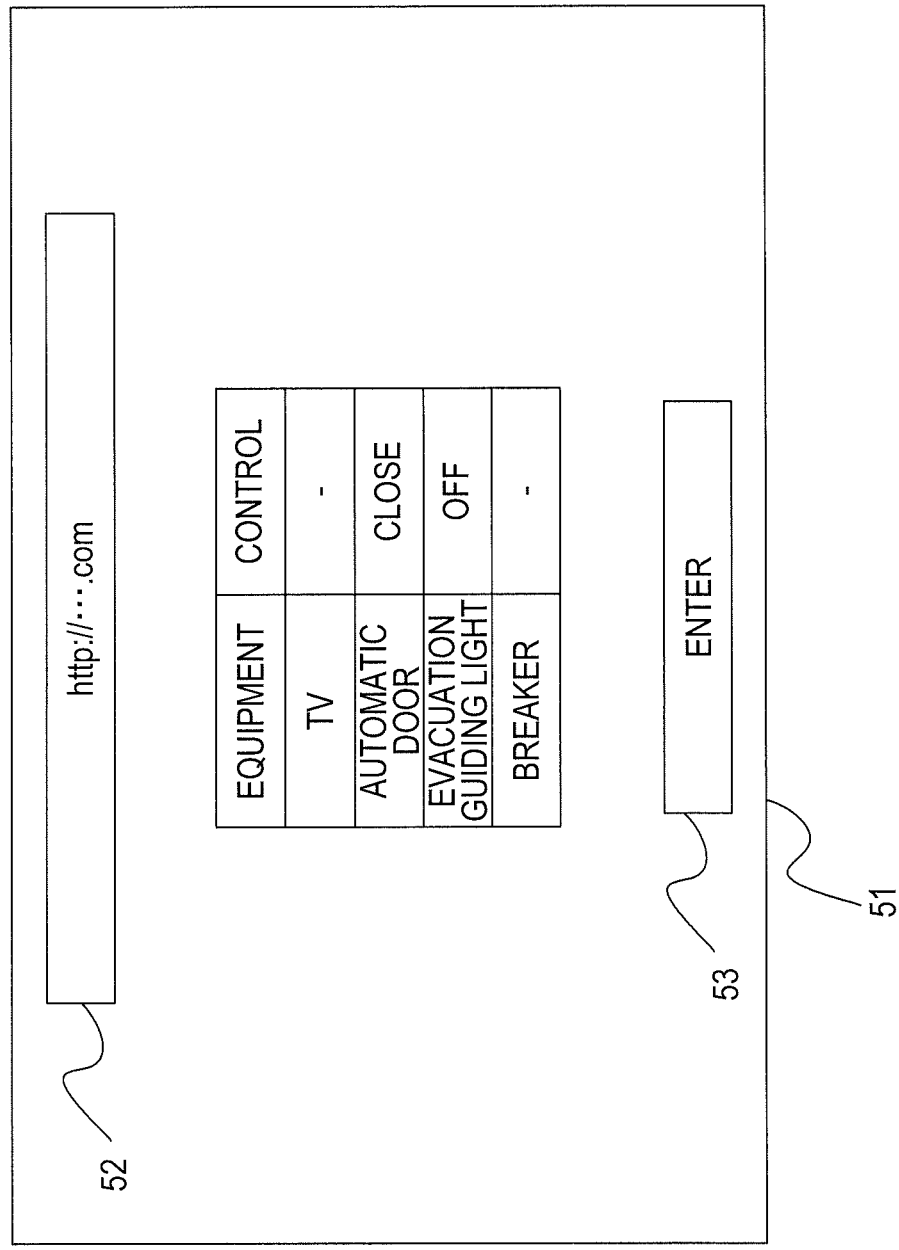
FIG. 15 is a diagram illustrating an example of a screen where settings for controlling equipment are made, according to an embodiment.

In an example of FIG. 15, the equipment control unit 44 does not perform control to turn on or off for the TV 7. In a case where the user B does not evacuate, the user B may not be needed to recognize the detailed information. Therefore, the TV 7 may be turned on or off.

Further, in a case where the user B evacuates, the equipment control unit 44 controls the automatic door 8 to be set at "OPEN" and the evacuation guiding light 61 to be turned on. In the meantime, in a case where the user B does not evacuate, even when the equipment control unit 44 controls the automatic door 8 to be set at "CLOSE" and the evacuation guiding light to be turned off, safety of the user B may be secured.

The equipment control unit 44 does not perform a control to turn on or off for the breaker 62. However, when the user B is in the stay-at-home state, it is assumed that the breaker 62 is in an ON state. Therefore, when the equipment control unit 44 does not perform control to turn off the breaker 62, the breaker 62 is maintained in the ON state.

Second Specific Example

The second specific example is an example of a case where the home wireless communication apparatus 6 has received the disaster notification indicating that the disaster type is the tsunami. As illustrated in the example of FIG. 14, when the user B is in the stay-at-home state, the disaster notification processing unit 43 sends an instruction to the equipment control unit 44 to perform a control to turn on the TV 7 and the breaker in a case where the home wireless communication apparatus 6 has received the disaster notification indicating that the disaster type is the tsunami.

Since the TV 7 is automatically turned on, the user B who is in the stay-at-home state may recognize the detailed information about tsunami. Further, since the TV 7 is turned off when the breaker 62 is turned off, the equipment control unit 44 performs control to turn on the breaker 62.

When the disaster type is the tsunami, extra time exists than a case of earthquake. Therefore, the equipment control unit 44 does not perform a control to change the states of the automatic door 8 and the evacuation guiding light 61. That is, the automatic door 8 and the evacuation guiding light 61 are maintained in the state before receipt of the disaster notification.

When the user B has evacuated from his home, the user-count managed by the user management unit 42 becomes "0" similarly as in the first specific example. Accordingly, the presence identification information indicates the absence-from-home and the equipment control unit 44 performs a control in accordance with a case of the "during absence-from-home" indicated in the example of FIG. 14 on the respective pieces of equipment.

Since the automatic door 8 is locked in the closed state, the damage such as a sneak-thief may be prevented. Further, since the breaker 62 is turned off, the secondary damage such as the electrical leakage may be prevented. In particular, in a case of the tsunami, the electric system may be flooded so that the electrical leakage easily occurs. Therefore, when the user is absent from home, turning off the breaker 62 is effective.

In the meantime, as described above, in the case of the tsunami, when the breaker 62 is in the ON state, the secondary damage by the electrical leakage may occur. Therefore, when the disaster type is the tsunami, the equipment control unit 44 may turn off the breaker 62 after a predetermined time has elapsed regardless of the presence identification information.

Third Specific Example

The third specific example is an example of control at the time when the user is in the absence-from-home state. That is, the user-count managed by the user management unit 42 is "0". In this case, the equipment control unit 44 performs a control indicated in the example of FIG. 14 on the respective pieces of equipment.

Since the user is in the absence-from-home state, the TV 7 and the evacuation guiding light 61 are not needed to be turned on. Therefore, the equipment control unit 44 turns off the breaker 62. In this manner, the secondary damage such as leakage of electricity may be prevented. Further, the equipment control unit 44 may lock the automatic door 8 in the closed state to prevent the secondary damage.

<Other>

As described above, the equipment control unit 44 performs different controls on the respective pieces of equipment, depending on whether the presence identification information indicates the absence-from-home or the stay-at-home. The presence identification information may be recognized based on the communication situation of the portable terminal M with respect to the home wireless communication apparatus 6.

Accordingly, since the equipment control unit 44 performs different controls on the respective pieces of equipment based on the presence identification information when the disaster notification is received, the equipment control unit 44 may perform the equipment control in accordance with the situation at the time when the disaster notification is received. Further, the equipment control unit 44 may perform the equipment control in accordance with the presence identification information as well as the disaster type. In this manner, it is possible to perform more flexible equipment control in accordance with the situation when the disaster notification is detected.

The presence identification information regards the pre-registered portable terminal M as a processing target. For example, the user management unit 42 manages the user-count by regarding the portable terminal M registered in the CSG as the processing target. This allows the user management unit 42 to set the managing target user as a particular user (registered user). In this manner, an accuracy of management is improved.

Further, when the presence identification information is changed from the stay-at-home to the absence-from-home, the equipment control unit 44 changes the equipment control from that for a case of the stay-at-home to that for a case of the absence-from-home, thereby preventing the damage such as a sneak-thief or electrical leakage.

In the example described above, descriptions have been made on an example in which the MME is applied for the disaster notification apparatus 5 and the MME transmits the ETWS message as the disaster notification. The disaster notification apparatus 5 may not be the MME and the disaster notification apparatus 5 may notify the disaster information by using information other than the ETWS message.

Further, the home wireless communication apparatus 6 manages whether the user is preregistered in the CSG, however, the home wireless communication apparatus 6 may manage whether the user is a preregistered user using a scheme other than the CSG.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to perform a process, the process comprising:
    determining whether a user of a portable terminal is present inside of a building or outside of the building based on a communication situation between a wireless communication apparatus provided in the building and one or more portable terminals; and
    upon receiving a disaster notification indicating an occurrence of a disaster, controlling a plurality of pieces of equipment installed within the building, each of the plurality of pieces of equipment being controlled differently based on whether it is determined that the user of the portable terminal is present inside of the building or is present outside of the building and based on a disaster type included in the disaster notification, the plurality of pieces of equipment including a first piece of equipment that is turned off when it is determined that the user of the portable terminal is present inside of the building regardless of the disaster type, a second piece equipment that is turned on when it is determined that the user of the portable terminal is present inside of the building regardless of the disaster type, and a third piece of equipment that is turned on when it is determined that the user of the portable terminal is present inside of the building and the disaster type is a first disaster type and is turned off when it is determined that the user of the portable terminal is present inside of the building and the disaster type is a second disaster type that is different from the first disaster type.

2. The non-transitory, computer-readable recording medium of claim 1, wherein
    the plurality of pieces of equipment include an information output device configured to output information; and
    the process further comprises:
    turning on a power source of the information output device when it is determined that the user of the portable terminal is present inside of the building, and
    turning off the power source of the information output device when it is determined that the user of the portable terminal is present outside of the building.

3. The non-transitory, computer-readable recording medium of claim 1, wherein
    the plurality of pieces of equipment include a door of the building; and
    the process further comprises:
    opening the door when it is determined that the user of the portable terminal is present inside of the building, and
    closing the door when it is determined that the user of the portable terminal is present outside of the building.

4. The non-transitory, computer-readable recording medium of claim 1, wherein
    the plurality of pieces of equipment include a lighting fixture provided within the building,
    the process further comprises:
    turning on the lighting fixture when it is determined that the user of the portable terminal is present inside of the building, and
    turning off the lighting fixture when it is determined that the portable device of the user is present outside of the building.

5. The non-transitory, computer-readable recording medium of claim 1, the process further comprising
    controlling the plurality of pieces of equipment installed within the building, in accordance with presence identification information indicating whether the portable device of the user is present in the building.

6. The non-transitory, computer-readable recording medium of claim 1, wherein
    the plurality of pieces of equipment include a locking/unlocking device for a hinged door of a shelf provided in the building; and
    the process further comprises:
    locking the hinged door of the shelf when it is determined that a disaster type included in the disaster notification indicates earthquake and the user of the portable terminal is present inside of the building, and
    unlocking the hinged door of the shelf when it is determined that the disaster type indicates tsunami and the user of the portable terminal is present inside of the building.

7. The non-transitory, computer-readable recording medium of claim 1, the process further comprising:
    upon receiving the disaster notification, transmitting, to the portable terminal, disaster information indicating contents of the disaster, and transition information used for transition to a control screen for controlling the plurality of pieces of equipment;
    displaying, on the control screen, operation states of the plurality of pieces of equipment before receipt of the disaster notification; and
    upon receiving an instruction from the portable terminal via the control screen, restoring operation states of the plurality of pieces of equipment to operation states before receipt of the disaster notification.

8. The non-transitory, computer-readable recording medium of claim 1, wherein the portable terminal is a pre-registered portable terminal of the user; and the process further comprises determining whether the user is present inside of the building, based on a communication situation of the one or more portable terminals.

9. The non-transitory, computer-readable recording of claim 5, the process further comprising:

incrementing a user-count indicating a number of users whose portable terminals are present within the building when it is detected that the portable terminal has moved into a communication range of the wireless communication apparatus from outside the communication range;

decrementing the user-count when it is detected that the portable terminal has moved outside the communication range from inside of the communication range; and changing the presence identification information to indicate that the user is present outside of the building when a value of the user-count become zero, and changing the presence identification information to indicate that the user is present inside of the building when the value of the user-count has changed from zero to one.

10. The non-transitory, computer-readable recording of claim 5, the process further comprising when the presence identification information is changed, switching control of the plurality of pieces of equipment in accordance with the changed presence identification information.

11. The non-transitory, computer-readable recording medium of claim 5, the process further comprising changing settings for the control of the plurality of pieces of equipment in accordance with the disaster type and the presence identification.

12. The non-transitory, computer-readable recording medium of claim 1, wherein the wireless communication apparatus is configured as an Evolved Node B; and the disaster notification is configured as an Earthquake and Tsunami Warning System message.

13. The non-transitory, computer-readable recording medium of claim 1, the process further comprising controlling a breaker to turn off after a predetermined time has elapsed in a case where the disaster type of the disaster notification indicates tsunami.

14. An equipment control method comprising:

determining whether a user of a portable terminal is present inside of a building or outside of the building based on a communication situation between a wireless communication apparatus provided in the building and one or more portable terminals; and upon receiving a disaster notification indicating an occurrence of a disaster, controlling a plurality of pieces of equipment installed within the building, each of the plurality of pieces of equipment being controlled differently based on whether it is determined that the user of the portable terminal is present inside of the building or is present outside of the building and based on a disaster type included in the disaster notification, the plurality of pieces of equipment including a first piece of equipment that is turned off when it is determined that the user of the portable terminal is present inside of the building regardless of the disaster type, a second piece equipment that is turned on when it is determined that the user of the portable terminal is present inside of the building regardless of the disaster type, and a third piece of equipment that is turned on when it is determined that the user of the portable terminal is present inside of the building and the disaster type is a first disaster type and is turned off when it is determined that the user of the portable terminal is present inside of the building and the disaster type is a second disaster type that is different from the first disaster type.

15. An equipment control system comprising:

a disaster notification apparatus configured to transmit a disaster notification indicating an occurrence of a disaster; and a wireless communication apparatus provided in a building, the wireless communication apparatus including a processor configured to receive the disaster notification, wherein the processor determines whether a user of a portable terminal is present inside of the building or outside of the building, based on a communication situation between the wireless communication apparatus and one or more portable terminals; and upon receiving the disaster notification, the processor controls a plurality of pieces of equipment installed within the building, each of the plurality of pieces of equipment being controlled differently based on whether it is determined that the user of the portable terminal is present inside of the building or is present outside of the building and based on a disaster type included in the disaster notification, the plurality of pieces of equipment including a first piece of equipment that is turned off when it is determined that the user of the portable terminal is present inside of the building regardless of the disaster type, a second piece equipment that is turned on when it is determined that the user of the portable terminal is present inside of the building regardless of the disaster type, and a third piece of equipment that is turned on when it is determined that the user of the portable terminal is present inside of the building and the disaster type is a first disaster type and is turned off when it is determined that the user of the portable terminal is present inside of the building and the disaster type is a second disaster type that is different from the first disaster type.

* * * * *